United States Patent
Liu et al.

(10) Patent No.: US 8,477,581 B1
(45) Date of Patent: Jul. 2, 2013

(54) ASYMMETRY COMPENSATION SYSTEM

(75) Inventors: Jingfeng Liu, Longmont, CO (US); Jin Xie, Longmont, CO (US); Mats Oberg, Cupertino, CA (US)

(73) Assignee: Marvell International Ltd. (BM)

( * ) Notice: Subject to any disclaimer, the term of this patent is extended or adjusted under 35 U.S.C. 154(b) by 1058 days.

(21) Appl. No.: 12/104,879

(22) Filed: Apr. 17, 2008

Related U.S. Application Data

(60) Provisional application No. 60/912,313, filed on Apr. 17, 2007.

(51) Int. Cl.
*G11B 20/10* (2006.01)

(52) U.S. Cl.
USPC ..................................... 369/59.15; 369/59.21

(58) Field of Classification Search
None
See application file for complete search history.

(56) References Cited

U.S. PATENT DOCUMENTS

| | | | | |
|---|---|---|---|---|
| 5,744,993 | A * | 4/1998 | Sonntag | 327/307 |
| 6,324,144 | B1 * | 11/2001 | Won et al. | 369/59.15 |
| 6,449,110 | B1 * | 9/2002 | DeGroat et al. | 360/46 |
| 6,597,650 | B2 * | 7/2003 | Katakura et al. | 369/59.22 |
| 6,747,936 | B1 * | 6/2004 | Shim | 369/59.22 |
| 7,298,570 | B1 | 11/2007 | Han | |
| 7,511,910 | B1 * | 3/2009 | Han | 360/65 |
| 2002/0053935 | A1 * | 5/2002 | Katakura et al. | 327/362 |
| 2005/0083822 | A1 * | 4/2005 | Park et al. | 369/59.27 |
| 2006/0023583 | A1 * | 2/2006 | Annampedu et al. | 369/47.1 |

OTHER PUBLICATIONS

Pozidis, H., Bergmans, J., and Coene, W., "Modeling and Compensation of Asymmetry in Optical Recording," IEEE Transactions on Communications, vol. 50, No. 12, Dec. 2002, pp. 2052-2063.

* cited by examiner

*Primary Examiner* — Christopher R Lamb
(74) *Attorney, Agent, or Firm* — Brinks Hofer Gilson & Lione

(57) ABSTRACT

A system with a nonlinear element processes a replay signal with a scaling factor into a signal compensated for asymmetry. The replay signal may include data from an optical disk. The scaling factor may be estimated based on the compensated signal and a scaling factor gain. The replay signal and the compensated signal may be converted into digital signals and processed digitally. In one embodiment, the compensated signal may be calculated as approximately the scaling factor multiplied by a square of an amplitude of the replay signal added to the amplitude of the replay signal. In another embodiment, the compensated signal may be calculated as approximately the scaling factor multiplied by an absolute value of an amplitude of the replay signal added to the amplitude of the replay signal. A related method is also disclosed. Other embodiments are provided, and each of the embodiments described herein can be used alone or in combination with one another.

18 Claims, 10 Drawing Sheets

ASYMMETRY COMPENSATION SYSTEM

CROSS-REFERENCE TO RELATED APPLICATION

This application claims the benefit of U.S. Provisional Application No. 60/912,313, filed Apr. 17, 2007, which is hereby incorporated by reference in its entirety.

TECHNICAL FIELD

The invention relates to optical recording. More particularly, the invention relates to asymmetry compensation of amplitude and duration variations of data read from optical disks.

BACKGROUND

An optical disk, such as a CD, DVD, HD DVD, or Blu-Ray disk, may contain data recorded as marks and spaces on the surface of the optical disk. The marks and spaces may correspond to zero and one bits comprising the data. After being recorded, the data may be read by detecting laser light reflected off the optical disk. The reflected light may be transformed by a photodetector to an analog replay signal. When the data is written, each mark and space may be intended to be the same nominal size on the optical disk. However, different types of optical disks and variations in the power and focus of the recording laser may cause asymmetry, where the sizes of the marks and spaces differ from their intended nominal sizes. When reading the marks and spaces, asymmetry in the replay signal may result in amplitude and duration variations and an increase in the bit error rate.

Asymmetry may be modeled and compensated for to improve the accuracy and reliability of data read from optical disks. Existing asymmetry compensation systems may use linear models to model asymmetry but may not be accurate at higher recording densities. Nonlinear models may also be used to model magnetic recording asymmetry. However, these magnetic recording models may not accurately model the nonlinearity and asymmetry of optical recording. For example, in magnetic recording, the nonlinearity is present in the magnetic read transducer that converts the magnetic data to an electrical signal. In contrast, nonlinearity in optical recording is due to variations in the marks and spaces on the surface of the disk. Some other systems may use a Volterra series nonlinear model with a maximum-likelihood sequence detector to model and detect asymmetry, but may use increased computing resources and may not be accurate for larger degrees of asymmetry. Other existing systems may compensate for asymmetry in downstream processing components, such as in a Viterbi decoder, leading to increased complexity and use of computing resources. Therefore, there is a need for a simple nonlinear model that accurately and reliably compensates for asymmetry of data read from optical disks.

SUMMARY

The present invention is defined by the following claims, and nothing in this section should be taken as a limitation on those claims.

The embodiments described below provide a system including a nonlinear element that processes a replay signal into a signal compensated for asymmetry. The replay signal may include optical disk data. The nonlinear element may process the replay signal with a scaling factor. The scaling factor may be estimated based on the compensated signal and a scaling factor gain. In some embodiments, the scaling factor estimation may be performed by a loop filter, such as a proportional loop, an integral loop, and/or a differential loop. The replay signal and the compensated signal may be converted into digital signals and processed digitally. The compensated signal may also be corrected for a DC offset. In one embodiment, the compensated signal may be calculated as approximately the scaling factor multiplied by a square of an amplitude of the replay signal added to the amplitude of the replay signal. In another embodiment, the compensated signal May be calculated as approximately the scaling factor multiplied by an absolute value of an amplitude of the replay signal added to the amplitude of the replay signal. A related method is also disclosed.

In another embodiment, a system comprises nonlinear means for processing a replay signal with a scaling factor into a signal compensated for asymmetry. The replay signal may include optical disk data. The scaling factor may be calculated by estimation means, based on the compensated signal and a scaling factor gain. The estimation means may include a loop filter, such as a proportional loop, an integral loop, and/or a differential loop. The replay signal and the compensated signal may be converted into digital signals by analog-to-digital conversion means. DC offset calculation means may also process the compensated signal to correct for DC offset. Envelope detection means may detect an amplitude of the compensated signal, and the DC offset calculation means may calculate the DC offset based on the detected amplitude. Bias error detection means may output the compensated signal in response to a bit slicer signal crossing through a zero value. The scaling factor estimation means may then estimate the scaling factor based on the compensated signal output from the bias error detection means. The nonlinear means may generate the compensated signal by the scaling factor multiplied by a square of an amplitude of the replay signal added to the amplitude of the replay signal. The nonlinear means may alternatively generate the compensated signal by the scaling factor multiplied by an absolute value of an amplitude of the replay signal added to the amplitude of the replay signal.

In another embodiment, a computer readable medium is encoded with computer executable instructions comprising nonlinearly processing a replay signal with a scaling factor into a compensated signal compensated for asymmetry. The replay signal may include optical disk data. The scaling factor may be estimated based on the compensated signal and a scaling factor gain. Estimating the scaling factor may include multiplying the compensated signal by the scaling factor gain to an intermediate signal, where the scaling factor gain comprises a proportional gain, an integral gain, or a differential gain. The intermediate signal may be accumulated to estimate the scaling factor. The instructions may also include converting the replay signal and the compensated signal to digital signals. The instructions may include calculating a DC offset of the compensated signal, so that estimating the scaling factor includes basing the estimation on the compensated signal corrected by the DC offset. The instructions may further include detecting an amplitude of the compensated signal and the DC offset calculation may then be based on the detected amplitude. Instructions may also output the compensated signal in response to a bit slicer signal crossing through a zero value, and estimate the scaling factor based on the output compensated signal. The nonlinear processing of the replay signal multiplies the scaling factor by a square of an amplitude of the replay signal and adding the amplitude of the replay signal. The nonlinear processing of the replay signal may alternatively multiply the scaling factor by an absolute value of an amplitude of the replay signal and add the amplitude of the replay signal.

Each of the embodiments described herein can be used alone or in combination with one another. The embodiments will now be described with reference to the attached drawings.

DETAILED DESCRIPTION

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

By way of overview, the embodiments described herein relate to a system of compensating for asymmetry in data read from optical disks. In the disclosed embodiments, a nonlinear element may process a replay signal with a scaling factor into a signal compensated for asymmetry. The replay signal may contain optical disk data. The scaling factor may be estimated based on the compensated signal and a scaling factor gain. The scaling factor estimation may be performed by a loop filter, such as a proportional loop, an integral loop, and/or a differential loop. The compensated signal may be calculated as approximately the scaling factor multiplied by a square of an amplitude of the replay signal added to the amplitude of the replay signal. The compensated signal may alternatively be calculated as approximately the scaling factor multiplied by an absolute value of an amplitude of the replay signal added to the amplitude of the replay signal. The compensated signal may be further processed in other parts of the system to recover the read data.

Figure 1:
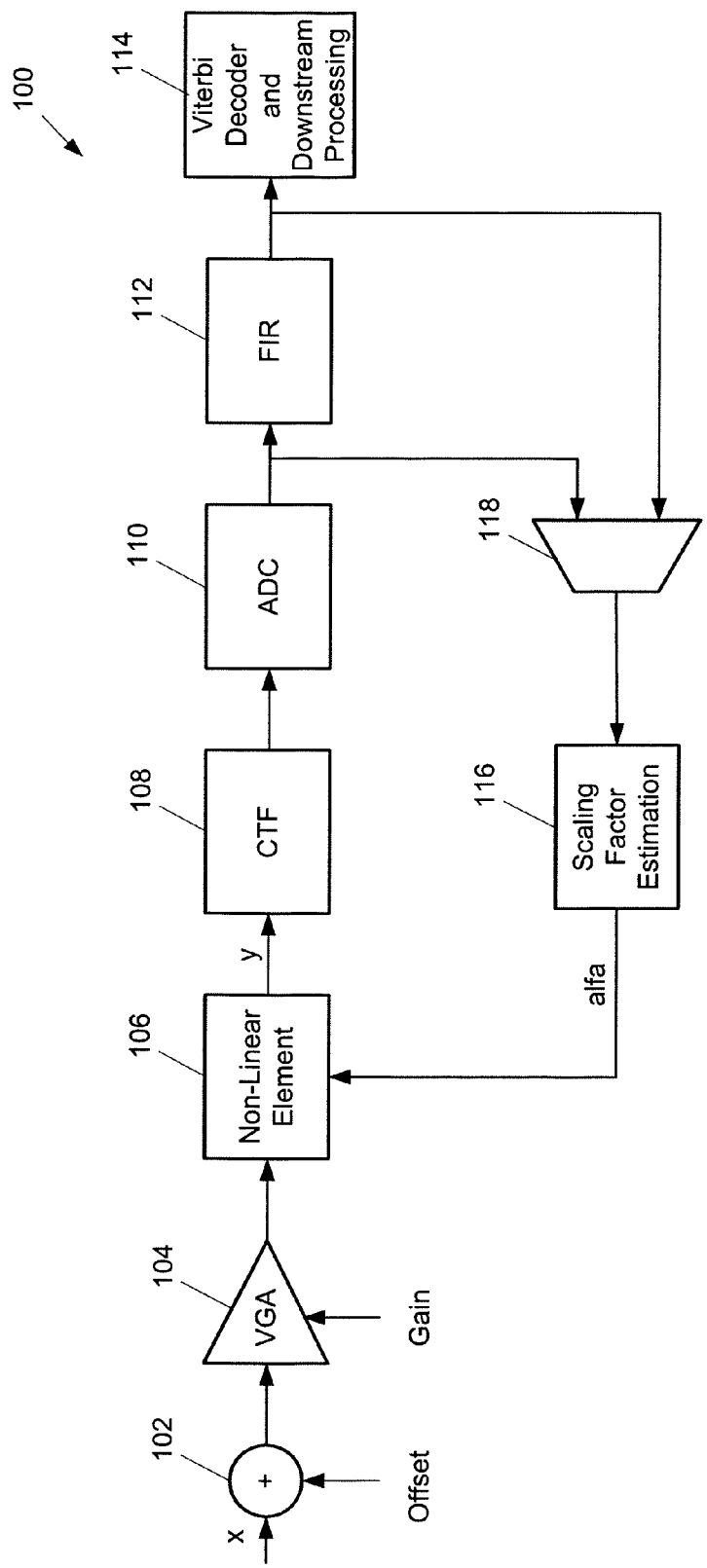
FIG. 1 is a block diagram of an embodiment of an asymmetry compensation system.

FIG. 1 is a block diagram of an embodiment of an asymmetry compensation system 100. The system 100 may include a nonlinear element 106 that processes a replay signal x with a scaling factor alfa into a compensated signal y. The nonlinear element 106 may compensate for the asymmetry in the replay signal x and generate the compensated signal y. The replay signal x may include data that has been read from an optical disk. The data may include asymmetry, e.g., variations in amplitude and duration. Offset and gain corrections may be provided to adjust the replay signal x for offset and gain distortions prior to the nonlinear element 106. The offset and gain corrections may be provided by control loops which receive error signals from an envelope detector or other component. The envelope detector may receive the output of an analog-to-digital converter (ADC) 110. The offset and gain control loops may be driven by the output of the envelope detector. The offset and gain control loops ensure that the mean of the top envelope and bottom envelope is at approximately zero. The offset and gain control loops also ensure that the bottom envelope subtracted from the top envelope is approximately constant. In particular, an adder 102 and a variable gain amplifier 104 may adjust the replay signal x by the offset and gain, respectively, prior to the asymmetry compensation performed by the nonlinear element 106. Other components may also adjust the replay signal x prior to processing by the nonlinear element 106.

The nonlinear element 106 may be implemented in hardware, firmware, or software, as examples. The nonlinear element 106 may compensate for asymmetry based on a Volterra series including the scaling factor alfa and the replay signal x. A Volterra series may model nonlinear behavior, such as asymmetry. One embodiment of the nonlinear element 106 calculates the compensated signal y as $y=x+alfa*x^2$. An alternative embodiment of the nonlinear element 106 calculates the compensated signal y as $y=x+alfa*|x|$. The compensated signal y may be filtered by a continuous time filter 108 to pass certain portions of the compensated signal and suppress other portions. The continuous time filter 108 may include a low pass filter, a high pass filter, or other filter. The filtered compensated signal may be sampled by an analog-to-digital converter (ADC) 110 and converted to a digital compensated signal. The digital compensated signal may be filtered by a finite impulse response (FIR) filter 112. The FIR filter 112 may condition the digital compensated signal to pass certain portions and suppress other portions. The filtered digital compensated signal may then be processed by a Viterbi decoder 114 and other downstream processing components to recover the data originally contained in the replay signal x. The Viterbi decoder 114, for example, may decode and error correct the filtered digital compensated signal. The Viterbi decoder 114 extracts information bits from the filtered digital compensated signal and passes the information bits to an error correction decoder.

In FIG. 1, the scaling factor estimation circuit 116 may receive the digital compensated signal generated by the ADC 110 or the filtered digital compensated signal generated by the FIR filter 112. The digital compensated signal or the filtered digital compensated signal may be selected by a multiplexer 118, as shown in FIG. 1, to be input to the scaling factor estimation circuit 116. Alternately, the digital compensated signal or the filtered digital compensated signal may be directly connected to the scaling factor estimation circuit 116. The FIR filter 112 allows additional tuning of the digital compensated signal for certain applications. For example, the FIR filter 112 can strengthen the amplitude of short duration pulses and suppress the amplitude of long duration pulses; which may allow the scaling factor to converge more quickly. Other components may process the compensated signal prior to being provided to the scaling factor estimation circuit 116. The scaling factor estimation circuit 116 may estimate the scaling factor alfa based on the compensated signal and a scaling factor gain. The scaling factor gain may include a proportional gain, an integral gain, and/or a differential gain. As discussed above, the scaling factor alfa may be used in the nonlinear element 106 to process the replay signal x into the compensated signal y. More, fewer, or other components may be included in the system 100.

Figure 2:
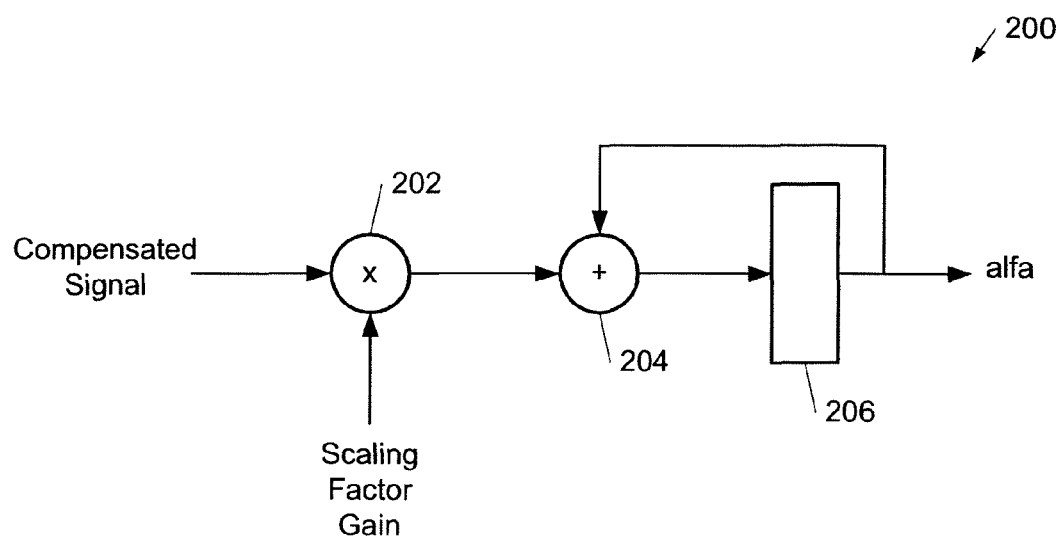
FIG. 2 is a prior art representation of an exemplary scaling factor estimation circuit.

FIG. 2 is a prior art representation of an exemplary scaling factor estimation circuit 200. The circuit 200 shows an integrating loop filter that may estimate the scaling factor alfa based on a compensated signal and a scaling factor gain, also known as a loop gain. The circuit 200 may correspond to the scaling factor estimation circuit 116 described above. In particular, the compensated signal may include the digital compensated signal from the ADC 110 or the filtered digital compensated signal generated by the FIR filter 112. The resulting multiplied signal may be summed at an adder 204 with a stored value from an accumulator 206. The scaling factor alfa may be generated from the stored value that is output from the accumulator 206.

Figure 3:
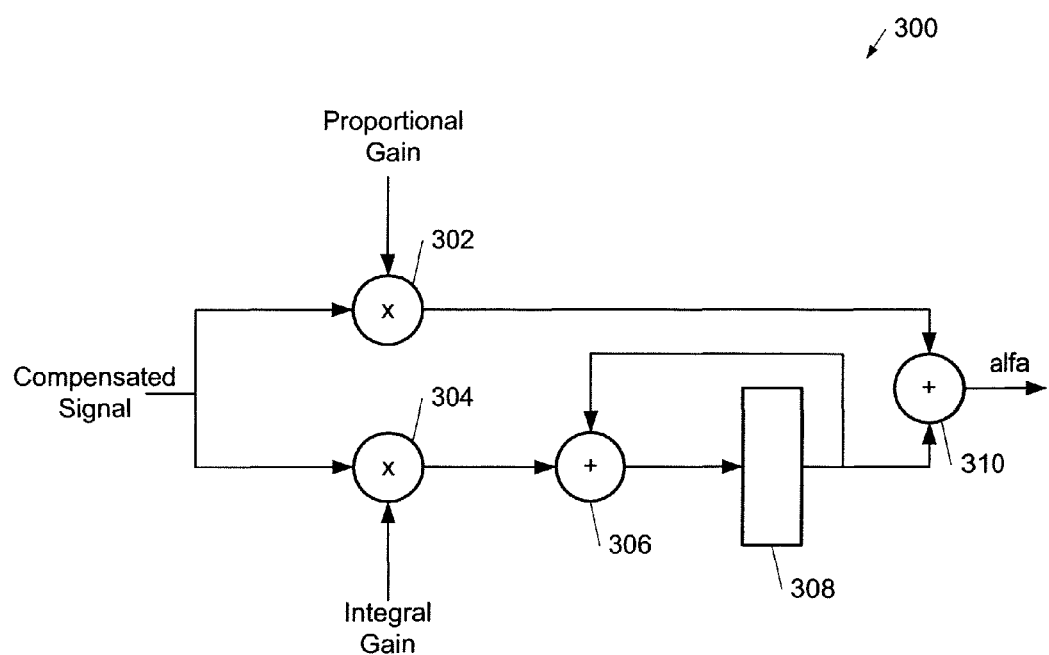
FIG. 3 is a prior art representation of a first alternative exemplary scaling factor estimation circuit.
Figure 4:
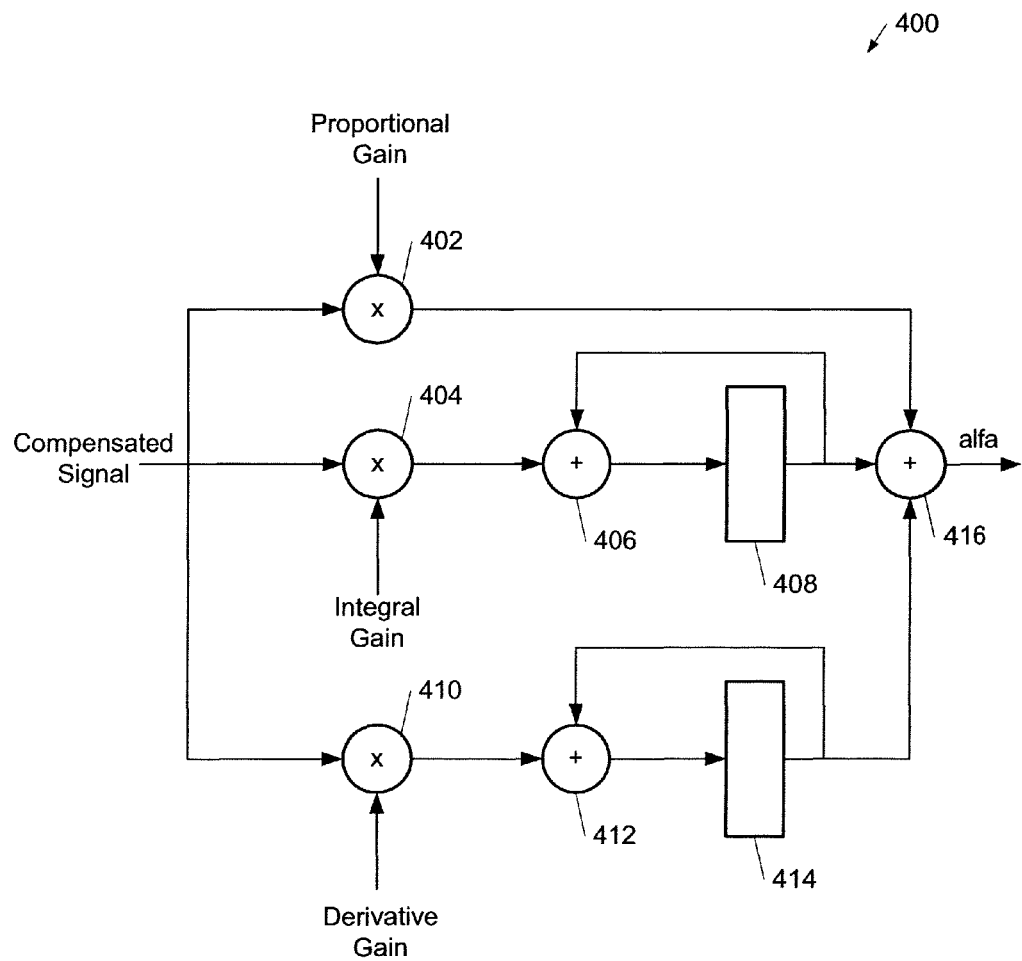
FIG. 4 is a prior art representation of a second alternative exemplary scaling factor estimation circuit.

Other prior art representations of exemplary scaling factor estimation circuits that may correspond to the scaling estimation circuit 116 include circuit 300 in FIG. 3 and circuit 400 in FIG. 4. The circuit 300 shows a proportional and integral (PI) loop filter and the circuit 400 shows a proportional, integral, and derivative (PID) loop filter. Similar to the circuit 200, the scaling factor alfa may be estimated in the circuit 300 based on a compensated signal, a proportional gain, and an integral gain, and estimated in the circuit 400 based on a compensated signal, a proportional gain, an integral gain, and a derivative gain.

Figure 5:
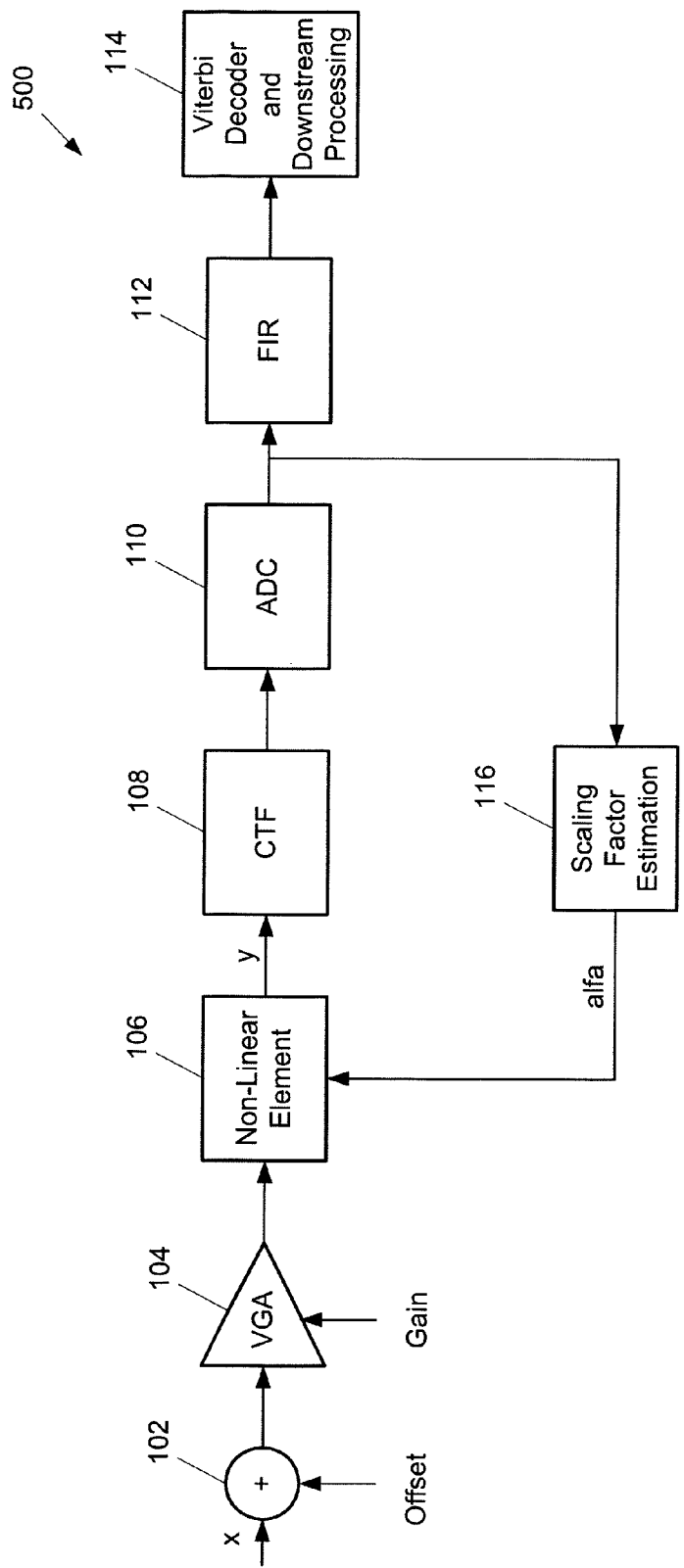
FIG. 5 is a block diagram of a first alternative embodiment of an asymmetry compensation system.

FIG. 5 is a block diagram of a first alternative embodiment of an asymmetry compensation system 500. The system 500 may include a nonlinear element 106 that processes an analog replay signal x with a scaling factor alfa into an analog compensated signal y. The replay signal x may include data that has been read from an optical disk. The data may include asymmetry such as variations in amplitude and duration. The compensated signal y may include the data compensated for the asymmetry by the nonlinear element 106. An analog offset and gain may be provided to adjust the replay signal x. In particular, an adder 102 and a variable gain amplifier 104 may add the offset and gain to the replay signal x, respectively, prior to the asymmetry compensation performed by the nonlinear element 106. Other components may also adjust the replay signal x prior to processing by the nonlinear element 106.

The nonlinear element 106 may compensate for asymmetry in the analog domain based on a Volterra series including the scaling factor alfa and the replay signal x. An embodiment of the nonlinear element 106 calculates the compensated signal y as $y=x+alfa*x^2$. An alternative embodiment of the nonlinear element 106 calculates the compensated signal y as $y=x+alfa*|x|$. The compensated signal y may be filtered by a continuous time filter 108, such as a low pass filter or other filter. The continuous time filter 108 may alternately be placed in front of the nonlinear element 106. The filtered compensated signal may be sampled by an analog-to-digital converter (ADC) 110 and converted to a digital compensated signal. The digital compensated signal may be filtered by a finite impulse response (FIR) filter 112, an infinite impulse response filter, or other type of filter. The filtered digital compensated signal may then be processed by a Viterbi decoder 114 and other downstream processing components to recover the data originally contained in the replay signal x. The scaling factor estimation circuit 116 may estimate the scaling factor alfa based on the digital compensated signal from the ADC 110 and a scaling factor gain. The scaling factor estimation circuit 116 may include the circuits 200, 300, or 400 described above, for example.

Figure 6:
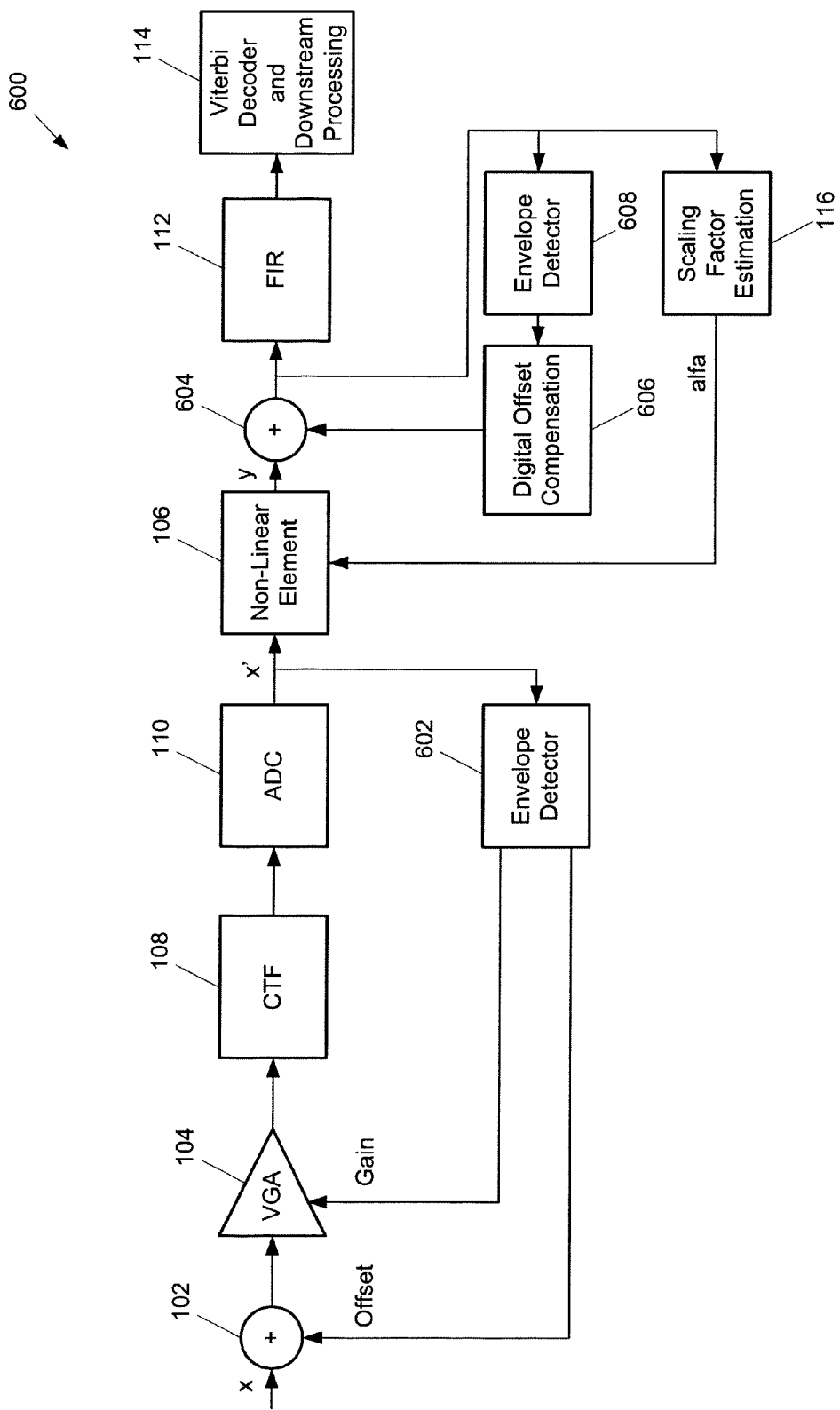
FIG. 6 is a block diagram of a second alternative embodiment of an asymmetry compensation system.

FIG. 6 is a block diagram of a second alternative embodiment of an asymmetry compensation system 600. The system 600 may include a nonlinear element 106 that processes a digital replay signal x' with a scaling factor alfa into a digital compensated signal y. An analog replay signal x may include data that has been read from an optical disk. The data may include asymmetry such as variations in amplitude and duration. The digital compensated signal y may include the data compensated for the asymmetry by the nonlinear element 106. An envelope detector 602 may detect the amplitude of the digital replay signal x' generated by an analog-to-digital converter (ADC) 110. The detected amplitude of the digital replay signal x' may be used to calculate the offset and gain provided to an adder 102 and a variable gain amplifier 104 to adjust the analog replay signal x. Other components may also adjust the replay signal x prior to processing by the nonlinear element 106.

The adjusted analog replay signal may be filtered by a continuous time filter 108, then sampled by the ADC 110 and converted to the digital replay signal x'. The nonlinear element 106 may compensate for asymmetry in the digital domain based on the scaling factor alfa and the digital replay signal x' from the ADC 110. An embodiment of the nonlinear element 106 calculates the digital compensated signal y as $y=x+alfa*x^2$. An alternative embodiment of the nonlinear element 106 calculates the digital compensated signal y as $y=x+alfa*|x|$. The digital compensated signal y may be added to a DC offset calculated by a digital offset compensation circuit 606 at adder 604. The DC offset may be caused by the nonlinear element 106 and the circuit 606 may calculate the DC offset so that it can be eliminated. In particular, the DC offset may be calculated by the circuit 606 based on the detected amplitude of the digital compensated signal y. The amplitude of the digital compensated signal y may be detected by an envelope detector 608 or other component.

The scaling factor estimation circuit 116 may estimate the scaling factor alfa based on the digital compensated signal y corrected by the DC offset, and a scaling factor gain. The scaling factor estimation circuit 116 may include the circuits 200, 300, or 400 described previously. The digital compensated signal y corrected by the DC offset may be filtered by a finite impulse response (FIR) filter 112. The digital compensated signal y may also be filtered by an infinite impulse response filter or other type of filter. The FIR filter 112 may condition the digital compensated signal y to pass certain portions and suppress other portions. The filtered digital compensated signal may then be processed by a Viterbi decoder 114 and other downstream processing components to recover the data originally contained in the analog replay signal x.

Figure 7:
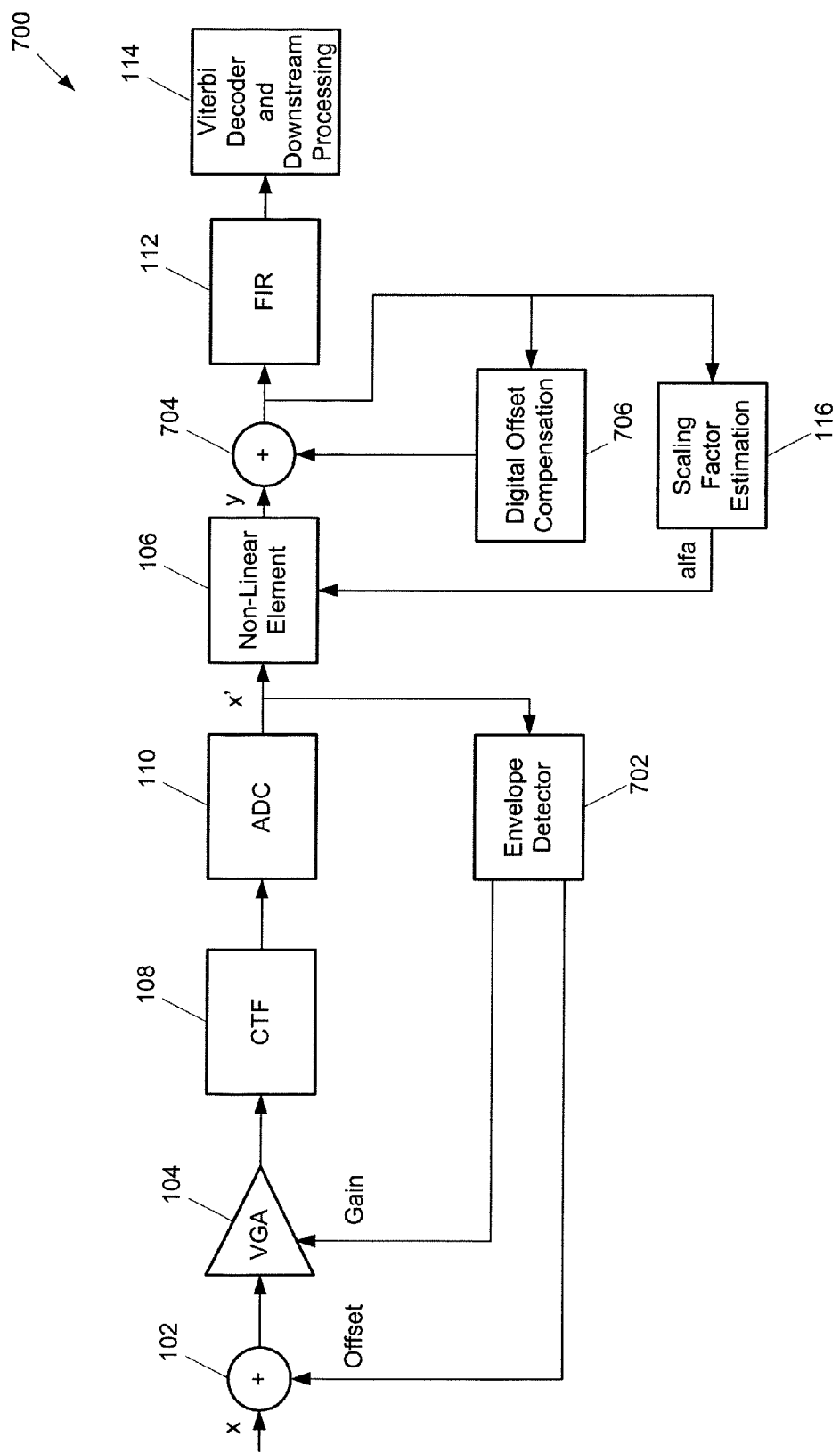
FIG. 7 is a block diagram of a third alternative embodiment of an asymmetry compensation system.

FIG. 7 is a block diagram of a third alternative embodiment of an asymmetry compensation system 700. The system 700 may include a nonlinear element 106 that processes a digital replay signal x' with a scaling factor alfa into a digital compensated signal y. An analog replay signal x may include data that has been read from an optical disk which may contain asymmetry. The digital compensated signal y may include the data compensated for the asymmetry. An envelope detector 702 may detect the amplitude of the digital replay signal x' generated by an analog-to-digital converter (ADC) 110. The detected amplitude of the digital replay signal x' may be used to calculate the offset and gain provided to an adder 102 and a variable gain amplifier 104 to adjust the analog replay signal x. Other components may also adjust the replay signal x prior to processing by the nonlinear element 106.

The adjusted analog replay signal may be filtered by a continuous time filter 108, then sampled by the ADC 110 and converted to the digital replay signal x'. The nonlinear element 106 may compensate for asymmetry in the digital domain based on the scaling factor alfa and the digital replay signal x' from the ADC 110. The digital compensated signal y may be added to a DC offset calculated by a digital offset compensation circuit 706 at adder 704. The DC offset may be caused by the nonlinear element 106 and the circuit 706 may calculate the DC offset so that it can be eliminated at the adder 704. The DC offset may be calculated by the circuit 706 based on the digital compensated signal y from the nonlinear element 106.

The scaling factor estimation circuit 116 may estimate the scaling factor alfa based on the digital compensated signal y corrected by the DC offset and a scaling factor gain. The scaling factor estimation circuit 116 may include the circuits 200, 300, or 400, for example. The digital compensated signal y corrected by the DC offset may be filtered by a finite impulse response (FIR) filter 112. The filtered digital compensated signal may then be processed by a Viterbi decoder 114 and other downstream processing components to recover the data originally contained in the analog replay signal x.

Figure 8:
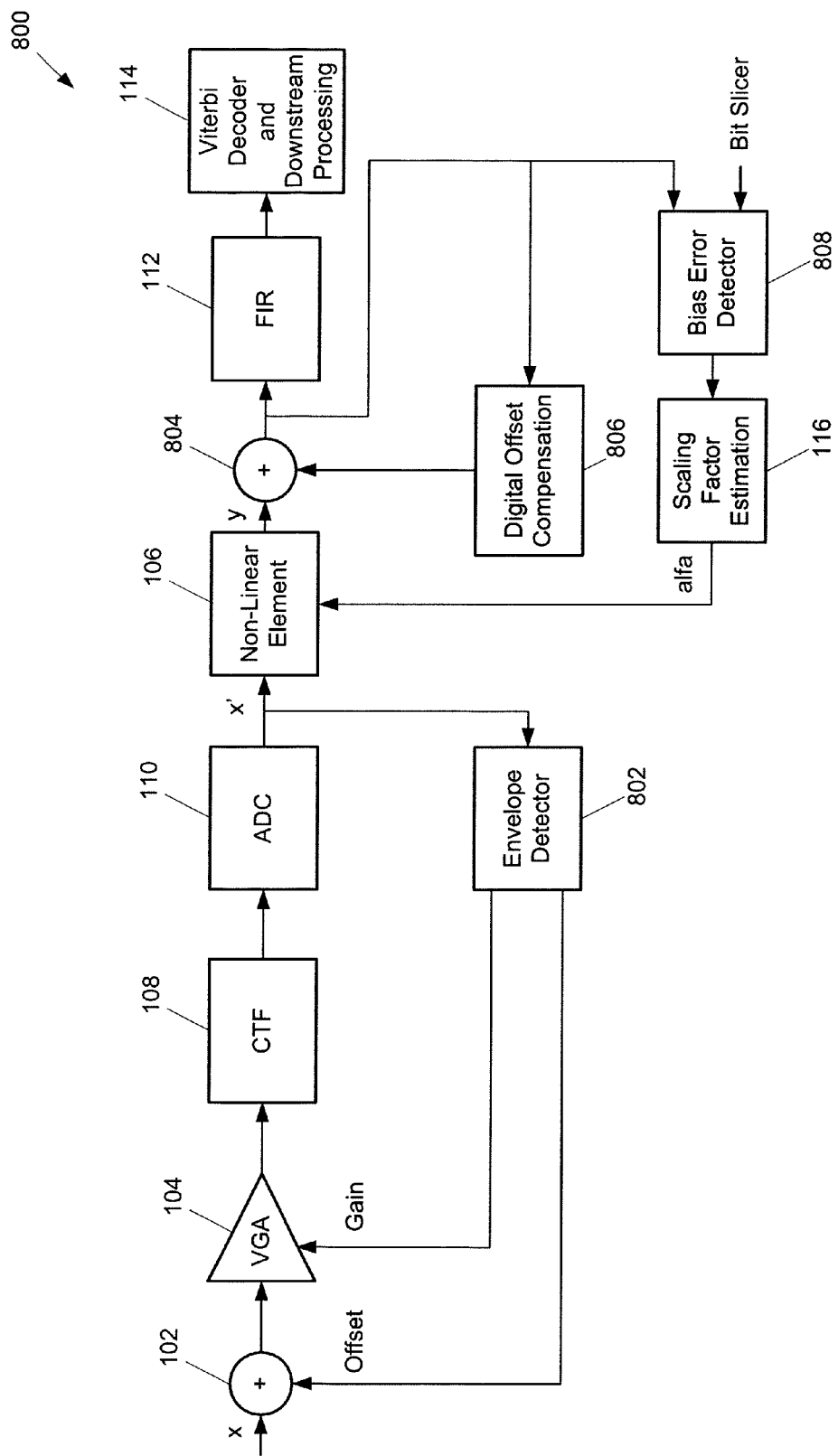
FIG. 8 is a block diagram of a fourth alternative embodiment of an asymmetry compensation system.

FIG. 8 is a block diagram of a fourth alternative embodiment of an asymmetry compensation system 800. The system 800 may include a nonlinear element 106 that processes a digital replay signal x' with a scaling factor alfa into a digital compensated signal y. An envelope detector 802 may detect the amplitude of the digital replay signal x' generated by an analog-to-digital converter (ADC) 110. The detected amplitude of the digital replay signal x' may be used to calculate the offset and gain provided to an adder 102 and a variable gain amplifier 104 to adjust the analog replay signal x. The adjusted analog replay signal may be filtered by a continuous time filter 108, then sampled by the ADC 110 and converted to a digital replay signal x'. Other components may also adjust the replay signal x prior to processing by the nonlinear element 106. The nonlinear element 106 may compensate for asymmetry in the digital domain based on the scaling factor alfa and the digital replay signal x'. The digital compensated signal y may be added to a DC offset calculated by a digital offset compensation circuit 806 at adder 804. The DC offset may be a result of the nonlinear element 106. In particular, the DC offset may be calculated by the circuit 806 based on the digital compensated signal y from the nonlinear element 106.

The scaling factor estimation circuit 116 may estimate the scaling factor alfa based on the digital compensated signal y corrected by the DC offset, and a scaling factor gain. The scaling factor estimation circuit 116 may include the circuits 200, 300, or 400, for example. The digital compensated signal y corrected by the DC offset may be an input to a bias error detector 808. The bias error detector 808 may output the current value of the digital compensated signal y when a bit slicer signal crosses through a zero value. The bit slicer signal enables detection of transitions of the output of the adder 804. By using the bias error detector 808 with the bit slicer signal, interaction between the scaling factor estimation circuit 116 and digital offset compensation circuit 806 may be eliminated in the system 800. Transitions of other signals may also cause the bit error detector 808 to output the current value of the digital compensated signal y. The bias error detector 808 may include combinatorial or sequential logic, or other components. The digital compensated signal y corrected by the DC offset may be filtered by a finite impulse response (FIR) filter 112. The filtered digital compensated signal may then be processed by a Viterbi decoder 114 and other downstream processing components to recover the data originally contained in the analog replay signal x.

Figure 9:
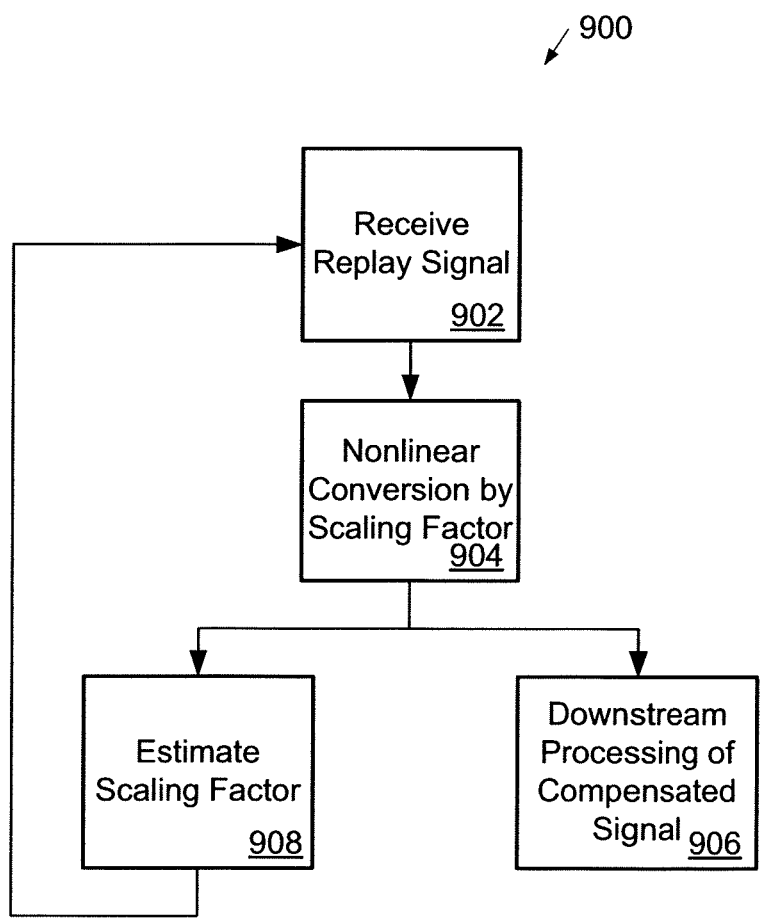
FIG. 9 is a flowchart that represents a method of asymmetry compensation.

FIG. 9 is a flowchart that represents a method 900 of asymmetry compensation. A replay signal may be received at Act 902. The replay signal may include data read from an optical disk, and contain asymmetry, e.g., variations in amplitude and duration of the data. The replay signal may be adjusted for offset and gain. At Act 904, the replay signal may be nonlinearly processed with a scaling factor alfa to a compensated signal. The compensated signal may include the data in the replay signal, but be compensated for the asymmetry by the nonlinear processing. The nonlinear processing may compensate for asymmetry based on a Volterra series including the scaling factor alfa and the replay signal x. A Volterra series may model nonlinear behavior, such as asymmetry. The nonlinear processing may calculate the compensated signal as $x+alfa*x^2$. Alternatively, the nonlinear processing at Act 904 may calculate the compensated signal as $x+alfa*|x|$. The nonlinear processing at Act 904 may be performed in the analog or digital domain.

At Act 906, the compensated signal may be further processed to recover the data originally contained in the replay signal. Act 906 may include Viterbi decoding to decode and error correct the compensated signal. At Act 908, the scaling factor used in the nonlinear processing may be estimated. The scaling factor may be based on the compensated signal and a scaling factor gain. The scaling factor gain may include a proportional gain, an integral gain, and/or A differential gain. The method 900 may return to Act 902 and apply the estimated scaling factor from Act 908 to newly received replay signals.

Figure 10:
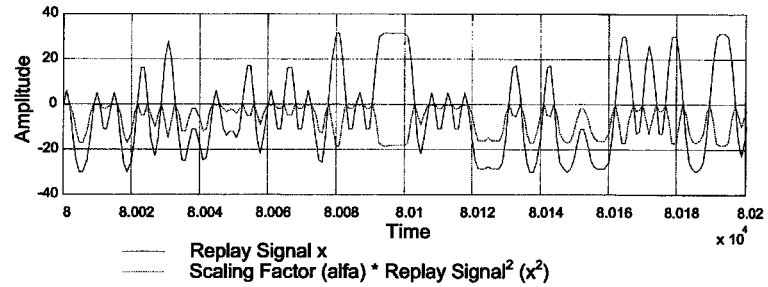
FIGS. 10-12 are plots showing exemplary waveforms representing a replay signal and a compensated signal.
Figure 11:
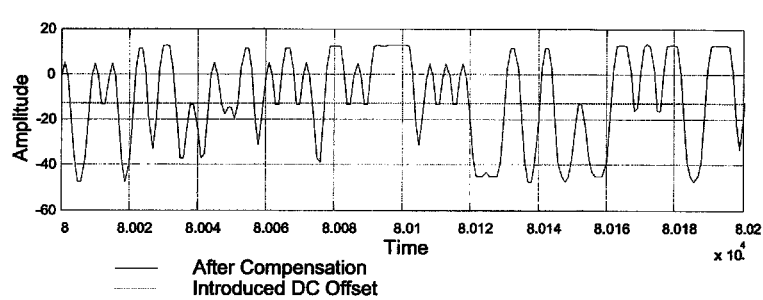
Figure 12:
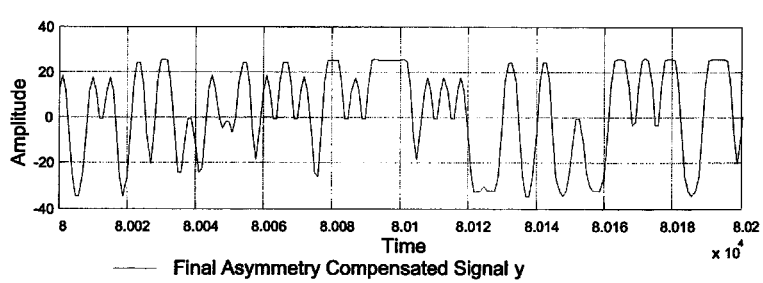

FIGS. 10-12 are plots showing exemplary waveforms representing a replay signal containing data read from an optical disk and a compensated signal that includes the asymmetry compensated replay signal. In each of the FIGS. 10-12, the horizontal axis shows time, where each unit is a clock period of one bit. The vertical axis in each of the FIGS. 10-12 shows the digital value of the signal amplitude. FIG. 10 shows a plot of the amplitude and duration of a replay signal as a solid line. The replay signal may contain asymmetry, e.g., variations in amplitude and duration of the data. The scaling factor alfa multiplied by a square of the replay signal ($x^2$) that may be calculated by a nonlinear element 116, for example, is shown as a dotted line in FIG. 10. FIG. 11 shows a plot of the compensated signal as a solid line. The compensated signal corrects the asymmetry present in the replay signal. The compensated signal may be based on the replay signal and the scaling factor. In FIG. 11, the dotted line shows the DC offset that may be introduced by the nonlinear element 116. The DC offset may be eliminated by a digital offset compensation circuit. FIG. 12 shows a plot of the final asymmetry compensated signal. The final asymmetry compensated signal shows the compensated signal corrected by the DC offset.

All of the discussion above, regardless of the particular implementation being described, is exemplary in nature, rather than limiting. Although specific components of the asymmetry compensation system are described, methods, systems, and articles of manufacture consistent with the asymmetry compensation system may include additional or different components. For example, components of the asymmetry compensation system, including the nonlinear element 106, may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the asymmetry compensation system may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. An asymmetry compensation system, comprising:
   a nonlinear element configured to:
     receive a digital adjusted replay signal comprising data read from an optical disk that is adjusted, at least in part, by an offset signal; and
     nonlinearly process the digital adjusted replay signal with a scaling factor to generate a compensated signal that is at least partly compensated for asymmetry;
   scaling factor estimation logic configured to estimate the scaling factor based on the compensated signal and a scaling factor gain, wherein the scaling factor is configured to compensate for asymmetry in the adjusted replay signal;
   an adder configured to add the data read from the optical disk with the offset signal, the digital adjusted replay signal being based, at least in part, on the data being added with the offset signal; and
   an envelope detector configured in a feedback loop, the envelope detector configured to:
     receive the adjusted replay signal;
     generate the offset signal based on the adjusted replay signal; and
     send the offset signal to the adder; and
   an analog-to-digital converter configured to:
     receive an analog adjusted replay signal, the analog adjusted replay signal being based, at least in part, on an output of the adder;
     convert the analog adjusted replay signal to the digital adjusted replay signal; and
     output the digital adjusted replay signal to the non-linear compensation element and to the envelope detector.

2. The system of claim 1, wherein the scaling factor estimation logic comprises a loop filter.

3. The system of claim 1, wherein the compensated signal comprises a digital compensated signal sampled by an analog-to-digital converter.

4. The system of claim 3, wherein the digital compensated signal comprises a digital filtered compensated signal, the digital filtered compensated signal processed from the digital compensated signal by a finite impulse response filter.

5. The system of claim 1, further comprising a digital offset calculator configured to calculate a DC offset of the compensated signal, and wherein the scaling factor estimation logic is further configured to estimate the scaling factor based on the compensated signal corrected by the DC offset.

6. The system of claim 5, wherein the envelope detector comprises a first envelope detector, the system further comprising second envelope detector configured to detect an amplitude of the compensated signal, and wherein the digital offset calculator is further configured to calculate the DC offset of the compensated signal based on the detected amplitude of the compensated signal.

7. The system of claim 1, further comprising:
   a bias error detector configured to receive the compensated signal and a bit slicer signal, and configured to output a current value of the compensated signal when the bit slicer signal crosses through a zero value.

8. The system of claim 1, wherein the envelope detector is configured to generate the offset signal by detection of an amplitude of the digital adjusted replay signal.

9. A method of asymmetry compensation, comprising:
   adding, with an adder, data read from an optical disk with an offset signal;
   converting an analog adjusted replay signal to a digital adjusted digital replay signal, the analog adjusted replay signal being based, at least in part, on an output of the adder; and
   sending the digital adjusted replay signal to a nonlinear element and feeding back the digital adjusted replay signal to an envelope detector;
   nonlinearly processing, with the nonlinear element, the digital adjusted replay signal with a scaling factor to generate a compensated signal that is compensated for asymmetry;
   generating, with the envelope detector, the offset signal based on the digital adjusted replay signal;
   sending, with the envelope detector, the offset signal back to the adder; and
   estimating the scaling factor based on the compensated signal and a scaling factor gain, wherein the scaling factor is configured to compensate for asymmetry in the digital adjusted replay signal.

10. The method of claim 9, wherein estimating the scaling factor comprises loop filtering the compensated signal with a scaling factor gain to estimate the scaling factor.

11. The method of claim 9, the compensated signal comprises a digital compensated signal.

12. The method of claim 11, further comprising finite impulse response filtering the digital compensated signal to a generate a filtered digital compensated signal.

13. The method of claim 9, further comprising calculating a DC offset of the compensated signal, and wherein estimating the scaling factor further comprises estimating the scaling factor based on the compensated signal corrected by the DC offset.

14. The method of claim 13, further comprising detecting an amplitude of the compensated signal, and wherein calculating the DC offset further comprises calculating the DC offset of the compensated signal based on the detected amplitude of the compensated signal.

15. The method of claim 9, wherein nonlinearly processing the replay signal comprises one of:
   multiplying the scaling factor by a square of an amplitude of the digital adjusted replay signal and adding the amplitude of the digital adjusted replay signal; or
   multiplying the scaling factor by an absolute value of an amplitude of the digital adjusted replay signal and adding the amplitude of the digital adjusted replay signal.

16. The method of claim 9, further comprising:
receiving the compensated signal and a bit slicer signal; and\
outputting a current value of the compensated signal when the received bit slicer signal crosses through a zero value.

17. The method of claim 9, further comprising: detecting, with the envelope detector, an amplitude of the digital adjusted replay signal to generate the offset signal.

18. An asymmetry compensation system, comprising:
a nonlinear element configured to:
  receive an adjusted replay signal comprising data read from an optical disk that is adjusted, at least in part, by an offset signal; and
  nonlinearly process the adjusted replay signal with a scaling factor to generate a compensated signal that is at least partly compensated for asymmetry;
scaling factor estimation logic configured to estimate the scaling factor based on the compensated signal and a scaling factor gain, wherein the scaling factor is configured to compensate for asymmetry in the adjusted replay signal;
an adder configured to add the data read from the optical disk with the offset signal, the adjusted replay signal being based, at least in part, on the data being added with the offset signal; and
an envelope detector configured in a feedback loop, the envelope detector configured to:
  receive the adjusted replay signal;
  generate the offset signal based on the adjusted replay signal; and
  send the offset signal to the adder,
wherein the compensated signal comprises one of:
the scaling factor multiplied by a square of an amplitude of the adjusted replay signal added to the amplitude of the adjusted replay signal; or
the scaling factor multiplied by an absolute value of an amplitude of the adjusted replay signal added to the amplitude of the adjusted replay signal.

* * * * *